(12) United States Patent
Chen et al.

(10) Patent No.: US 9,716,880 B2
(45) Date of Patent: Jul. 25, 2017

(54) IMAGE CALIBRATING METHOD FOR STITCHING IMAGES AND RELATED CAMERA AND IMAGE PROCESSING SYSTEM WITH IMAGE CALIBRATING FUNCTION

(71) Applicant: VIVOTEK INC., New Taipei (TW)

(72) Inventors: Szu-Han Chen, New Taipei (TW); Pei-Hsien Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 38 days.

(21) Appl. No.: 14/973,733

(22) Filed: Dec. 18, 2015

(65) Prior Publication Data

US 2016/0189379 A1 Jun. 30, 2016

(30) Foreign Application Priority Data

Dec. 25, 2014 (TW) .............................. 103145534 A

(51) Int. Cl.
*G06K 9/00* (2006.01)
*H04N 17/00* (2006.01)
(Continued)

(52) U.S. Cl.
CPC .......... *H04N 17/002* (2013.01); *G06T 5/009* (2013.01); *G06T 5/40* (2013.01); *G06T 5/50* (2013.01);
(Continued)

(58) Field of Classification Search
CPC ... G06T 3/4038; G06T 11/60; G06T 2200/32; G06T 5/50; G06T 7/0028;
(Continued)

(56) References Cited

U.S. PATENT DOCUMENTS 7,778,485 B2    8/2010  Zeineh
2003/0234866 A1*  12/2003  Cutler ..................... G06T 5/008
                                                    348/207.1

(Continued)

FOREIGN PATENT DOCUMENTS

CN    101742341    6/2010
CN    102342092    2/2012
(Continued)

OTHER PUBLICATIONS

Fecker, Ulrich, Marcus Barkowsky, and André Kaup. "Histogram-based prefiltering for luminance and chrominance compensation of multiview video." IEEE Transactions on Circuits and Systems for Video Technology18.9 (2008): 1258-1267.*

*Primary Examiner* — Li Liu
(74) *Attorney, Agent, or Firm* — Winston Hsu

(57) ABSTRACT

An image calibrating method for stitching images includes calculating contrast values of a plurality of images, and comparing the contrast values to set the image with maximal contrast value as a reference image; others of the plurality of images are set as target images. The image calibrating method further includes calculating cumulative distribution functions of the reference image and the target images respectively, and obtaining a transform function according to the cumulative distribution functions of the reference image and the target images for pixel adjustment of the target images. Further, a camera with an image calibrating function and a related image processing system are disclosed in the present invention.

20 Claims, 7 Drawing Sheets

(51) Int. Cl.
*H04N 5/225* (2006.01)
*G06T 5/00* (2006.01)
*G06T 5/40* (2006.01)
*G06T 5/50* (2006.01)

(52) U.S. Cl.
CPC ....... *H04N 5/2258* (2013.01); *G06T 2200/32* (2013.01)

(58) Field of Classification Search
CPC ............. G06T 2207/10016; G06T 5/40; G06T 2207/20221; G06T 7/0024; G06T 7/0026; G06T 7/0034; G06K 2009/2045; G06K 9/00677; G06K 9/32; G06K 9/46; G09G 2340/10
See application file for complete search history.

(56) References Cited

U.S. PATENT DOCUMENTS

| | | | | |
|---|---|---|---|---|
| 2006/0115182 | A1* | 6/2006 | Deng | ....... G06T 5/009 382/284 |
| 2006/0187234 | A1* | 8/2006 | Deng | ............ G06F 3/1446 345/592 |
| 2013/0208997 | A1* | 8/2013 | Liu | ............ G06T 3/20 382/284 |
| 2013/0335596 | A1 | 12/2013 | Demandolx | |
| 2014/0071228 | A1* | 3/2014 | Cho | ............ H04N 5/23238 348/36 |
| 2015/0043817 | A1* | 2/2015 | Nakamura | ............ G06T 5/007 382/167 |
| 2015/0371387 | A1* | 12/2015 | Atanassov | ............ G06T 7/0028 348/49 |

FOREIGN PATENT DOCUMENTS

| | | | |
|---|---|---|---|
| CN | 101739674 | 10/2012 | |
| CN | 102097082 | 3/2013 | |
| CN | 102508628 | 12/2014 | |
| KR | WO 2010101434 A2 * | 9/2010 | ........... G06T 3/4038 |
| TW | 497366 | 8/2002 | |
| TW | 200903345 | 1/2009 | |

* cited by examiner

IMAGE CALIBRATING METHOD FOR STITCHING IMAGES AND RELATED CAMERA AND IMAGE PROCESSING SYSTEM WITH IMAGE CALIBRATING FUNCTION

BACKGROUND OF THE INVENTION

1. Field of the Invention

The present invention relates to an image calibrating method and a related camera and a related image processing system, and more particularly, to an image calibrating method for stitching images and a related camera and a related image processing system with image calibrating functions.

2. Description of the Prior Art

For expanding image monitoring range, the camera can dispose several image sensors adjacently placed to respectively capture a plurality of images in different directions. Scenes of the plurality of images are adjacent by each other, and edges of the images can be connected to generate a stitching image with large scene. However, different image sensors have different setting parameters, such like automatic exposure adjustment, luminance and chroma of the captured images are different, and an obvious junction between the captured images is easily noticed on the stitching image; therefore, the stitching image generated by the conventional camera and image processing system has low quality.

SUMMARY OF THE INVENTION

The present invention provides an image calibrating method for stitching images and a related camera and a related image processing system with image calibrating functions for solving above drawbacks.

According to the claimed invention, an image calibrating method for stitching adjacent images includes steps of calculating contrast values of a plurality of images, comparing the contrast values to set the image with maximal contrast value as a reference image, wherein the other images of the plurality of images are defined as target images, calculating probability distribution information of the reference image and the target images respectively, and obtaining a transform function according to the probability distribution information of the reference image and the target images for pixel adjustment of the target images.

According to the claimed invention, a camera with an image calibrating function includes a plurality of image sensors and a processor. The plurality of image sensors is adapted to respectively capture a plurality of images. The processor is coupled to the plurality of image sensors and adapted to stitch the plurality of images. The processor is utilized to execute an image calibrating method of calculating contrast values of a plurality of images, comparing the contrast values to set the image with maximal contrast value as a reference image, calculating probability distribution information of the reference image and the target images respectively, and obtaining a transform function according to the probability distribution information of the reference image and the target images for pixel adjustment of the target images, wherein the other images of the plurality of images are defined as target images.

According to the claimed invention, an image processing system capable of stitching images transmitted from at least one camera is disclosed. The image processing system is utilized to execute an image calibrating method of calculating contrast values of a plurality of images, comparing the contrast values to set the image with maximal contrast value as a reference image, calculating probability distribution information of the reference image and the target images respectively, and obtaining a transform function according to the probability distribution information of the reference image and the target images for pixel adjustment of the target images, wherein the other images of the plurality of images are defined as target images.

Because the image captured by different image sensors may have luminance difference and/or chroma difference from each other, the image calibrating method of the present invention sets the image with maximal contrast value as the reference image, acquires the transform function by the probability distribution information of the reference image and the target images, and then adjusts the target images by the transform function. The adjusted target image has the luminance information and the chroma information identical to ones of the reference image, so that the stitching image combined by the reference image and the adjusted target image has preferred quality without the chromatic aberration, and more particularly, the present invention provides preferable effect while stitching the plurality of images captured by the image sensors adjacently placed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
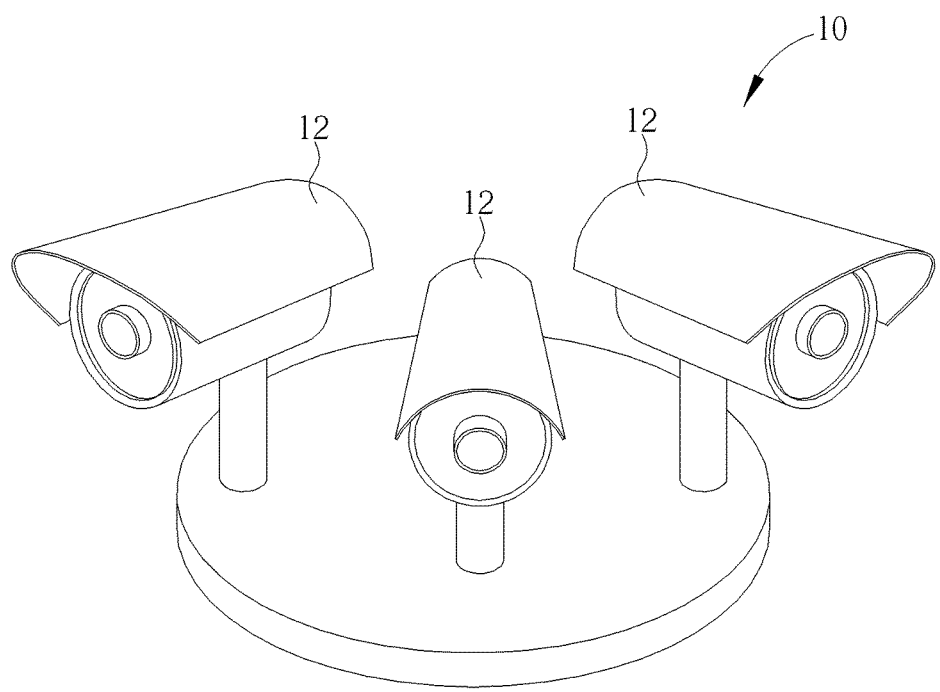
FIG. 1 is a diagram of an image processing system according to an embodiment of the present invention.
Figure 2:
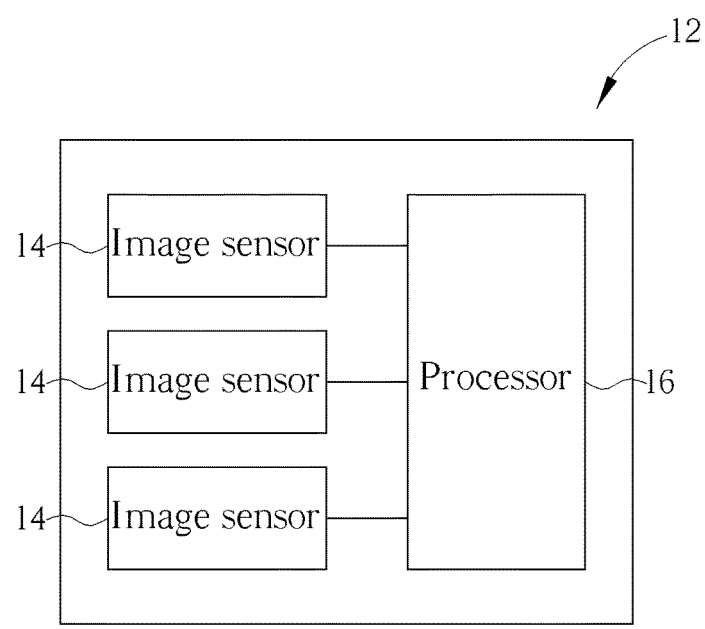
FIG. 2 is a functional block diagram of a camera according to the embodiment of the present invention.
Figure 9:
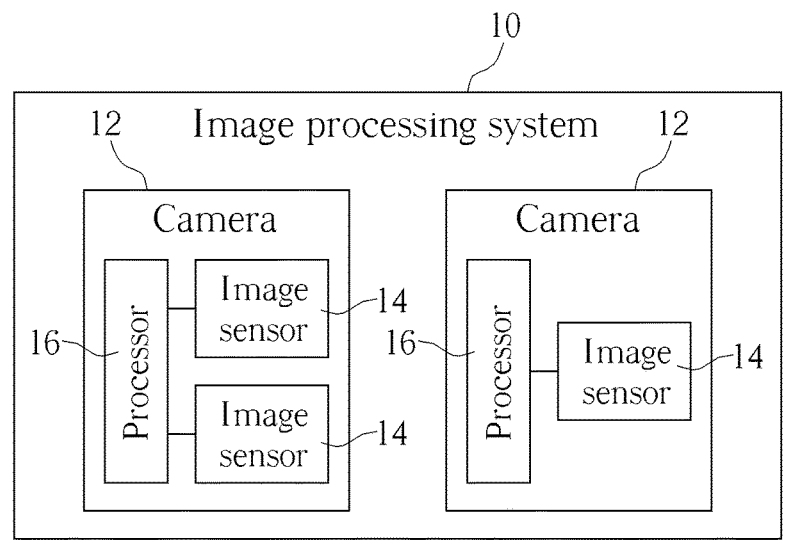
FIG. 9 and FIG. 10 respectively are functional block diagrams of the image processing system 10 shown in FIG. 1 in different operational modes.
Figure 10:
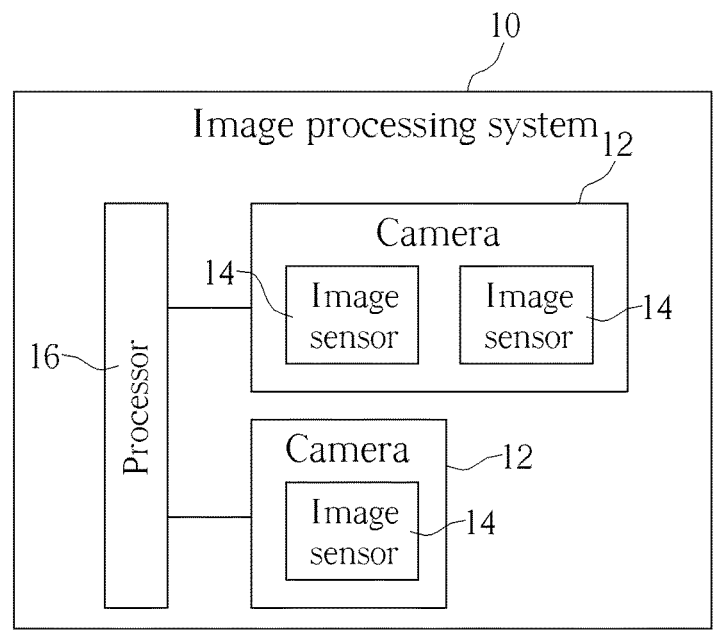

Please refer to FIG. 1, FIG. 2, FIG. 9 and FIG. 10. FIG. 1 is a diagram of an image processing system 10 according to an embodiment of the present invention. FIG. 2 is a functional block diagram of a camera 12 according to the embodiment of the present invention. FIG. 9 and FIG. 10 respectively are functional block diagrams of the image processing system 10 shown in FIG. 1 in different operational modes. The image processing system 10 can include the single camera 12 with several image sensors, or may include several cameras 12 which respectively have the single image sensor, or may include a combination of the single camera 12 with several image sensors and the cameras 12 which have the single image sensor. That is, the camera 12 can include one or more image sensors 14 and a processor 16 coupled to each other, as shown in FIG. 9. Besides, the camera 12 can merely include the image sensor 14 (or its built-in processor of the camera 12 is not applied to execute the image calibrating method of the present invention), and the external processor 16 (excluding the camera 12) is applied to execute the image calibrating method, as shown in FIG. 10.

In an embodiment of the present invention, the plurality of cameras 12 are disposed adjacent by each other and respectively face toward different directions, so as to capture the plurality of images having adjacent scenes. In another embodiment of the present invention, the camera 12 includes several image sensors 14, and the image sensors 14 are disposed adjacent to each other and respectively face different directions, to capture the plurality of images having adjacent scenes. The processor 16 can adjust hue, value and chroma of each image to reduce luminance and chroma difference between the adjacent images. The processor 16 can be any kind of processing unit, such as the central processing unit (CPU), the control unit, the micro controller, the microprocessor, the application-specific integrated circuit, the field-programmable gate array, the complex programmable logic device, the system-on-chip, the system-in-package and so on. In some embodiments of the present invention, as shown in FIG. 10, the processor 16 can be disposed on an electrical device excluding the camera 12, as the electrical device might be the computer, the server or any electrical device capable of executing the image processing method, which depends on design demand.

Figure 3:
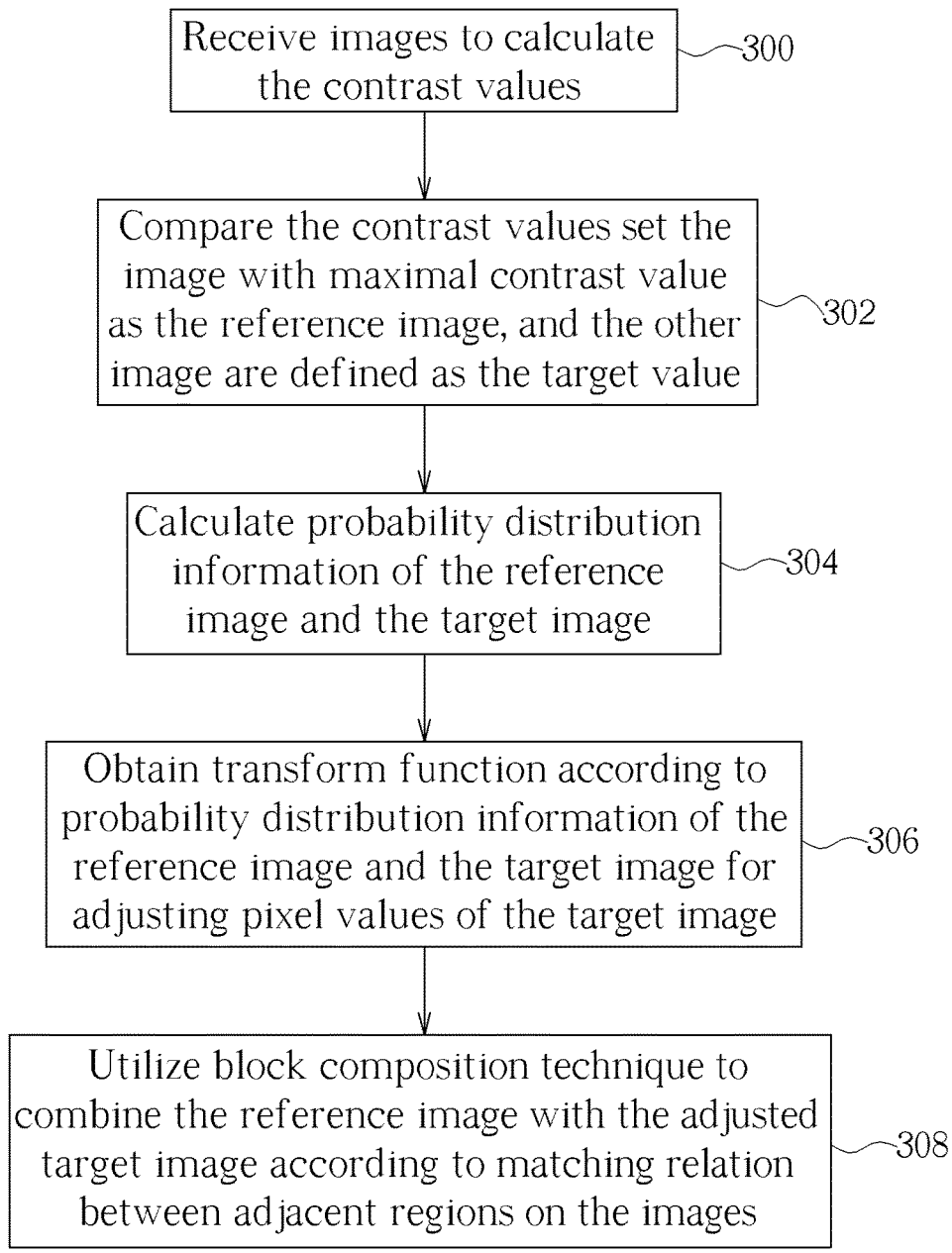
FIG. 3 is a flow chart of calibrating the image for image stitching according to the embodiment of the present invention.
Figure 4:
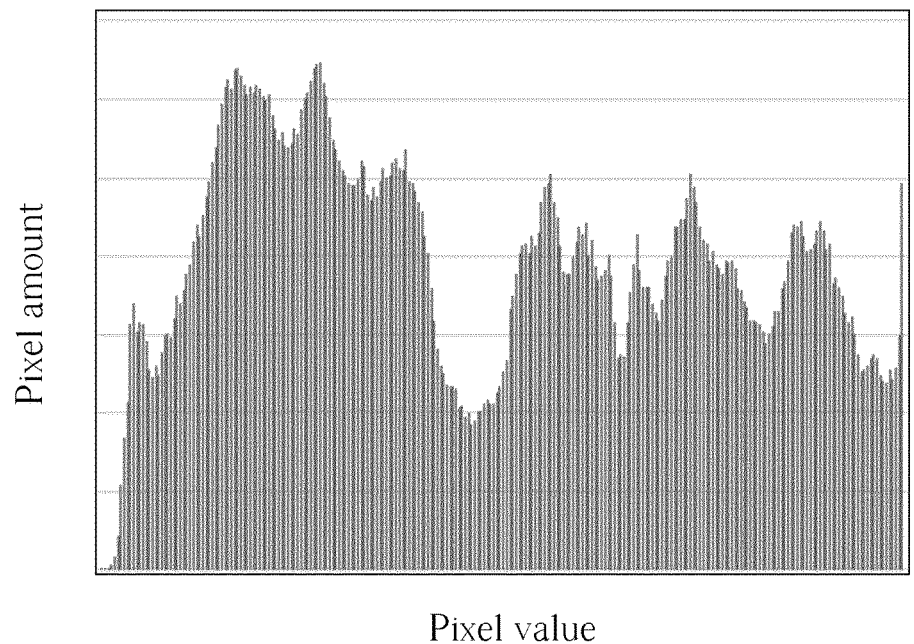
FIG. 4 is a luminance histogram of the captured image according to the embodiment of the present invention.
Figure 5:
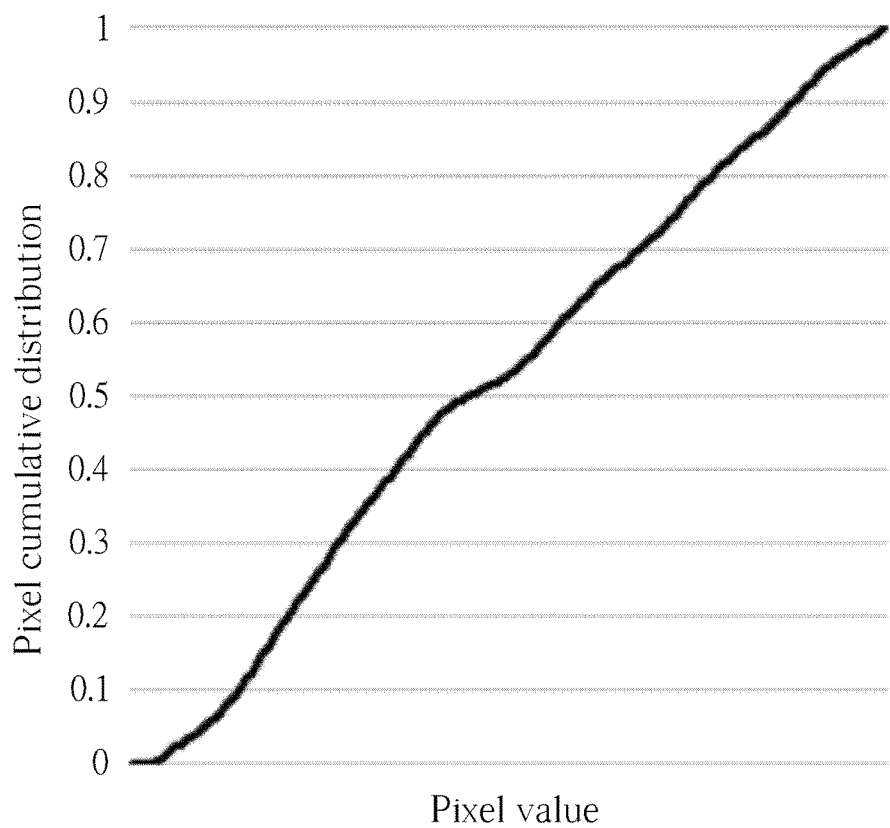
FIG. 5 is a probability distribution diagram corresponding to the luminance histogram shown in FIG. 4.

Please refer to FIG. 3 to FIG. 5. FIG. 3 is a flow chart of calibrating the image for image stitching according to the embodiment of the present invention. FIG. 4 is a luminance histogram of the captured image according to the embodiment of the present invention. FIG. 5 is a probability distribution diagram corresponding to the luminance histogram shown in FIG. 4. The image calibrating method illustrated in FIG. 3 is suitable for the image processing system 10 shown in FIG. 1 and the camera 12 shown in FIG. 2. The image calibrating method illustrated in FIG. 3 can be the computer program stored in the readable memory of the computer, and the computer reads the readable memory to execute the related image calibrating method. The readable memory of the computer can be the read-only memory, the flash memory, the floppy disk, the hard disk, the optical disk, the flash disk, the magnetic tape, and the database capable of accessing data by network. Application of the readable memory is not limited to the above-mentioned embodiments, and a detailed description is omitted herein for simplicity.

First, step 300 is executed that the processor 16 receives the plurality of images and calculates contrast values of the plurality of images. The plurality of images can be captured by several image sensors 14 of the individual camera 12, or be captured respectively by the individual image sensor 14 of several cameras 12. Scenes of the plurality of images are adjacent and those images are partially overlapped for the image stitching. Generally, the contrast value can be calculated according to luminance information or chroma information of pixels on the plurality of images. Then, step 302 is executed to compare the contrast values so as to set the image with maximal contrast value as the reference image, and the other images (excluding the foresaid reference image) having the contrast value smaller than the maximal contrast value are defined as the target values. The contrast value can be acquired by root mean square (RMS) calculation, entropy calculation, gray-level co-occurrence matrix (GLCM) calculation, etc.

Step 304 is executed to respectively calculate probability distribution information of the reference image and the target images. The probability information may include probability distribution or histogram about luminance information and/or chroma information of the images, or any information capable of showing luminance distribution and/or chroma distribution. The histogram shown in FIG. 4 indicates luminance distribution or chroma distribution about pixels on the target image. For example, the horizontal axis in FIG. 4 represents pixel values (which can be ranged between 0~255), and the longitudinal axis in FIG. 4 represents pixel amounts of each pixel value (which can be ranged between 0~255) on the target image. The probability distribution diagram shown in FIG. 5 indicates cumulative distribution of the luminance information or the chroma information about the pixels on the target image shown in FIG. 4. For example, the horizontal axis in FIG. 5 represents the pixel values (which can be ranged between 0~255), and the longitudinal axis in FIG. 5 represents the cumulative distribution of pixels (which can be smaller than or equal to values between 0~255) on the target image. Then, steps 306 and 308 are executed to obtain a transform function according to the probability distribution information of the reference image and the target images for adjusting the pixel value of the target image, and to utilize block composition technique to combine the reference image with the adjusted target image in accordance with matching relation between adjacent regions on the plurality of images. The image calibrating method of the present invention can directly adjust the pixel value or accordingly adjust other parameters of the target image to calibrate the luminance information and/or the chroma information of the target image, so as to make the target image be similar to the reference image for convenient stitching these images.

Figure 6:
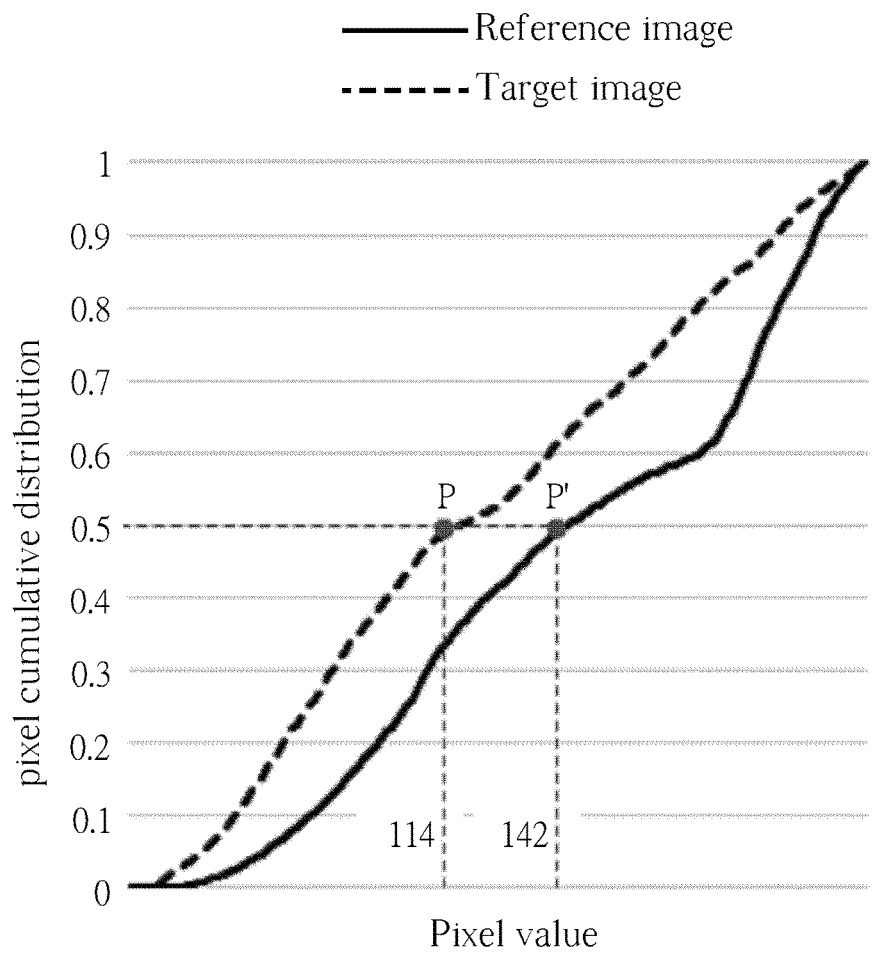
FIG. 6 is a diagram of the cumulative distribution functions of the reference image and the target image according to the embodiment of the present invention.

Please refer to FIG. 6, trends of the cumulative distribution functions of the reference image and the target image can be clearly expressed. The pixel values of the image are ranged between 0~255. The image calibrating method mentioned above utilizes the interpolation method to adjust the pixel cumulative distribution function of the target image, so as to be similar to the pixel cumulative distribution function of the reference image. First, the transform function finds out what regions the pixel cumulative distribution of the target image are located through the pixel cumulative distribution of the reference image, and then utilizes the foresaid regions to calculate the corresponding pixel values by the linear interpolation method. For example, since an original pixel value "114" of the target image conforms to the distribution value "0.5" via a point P on the pixel cumulative distribution function, the transform function can utilize interpolation calculation to acquire a point P' on the pixel cumulative distribution function of the reference image that conforms to the distribution value "0.5" and has the pixel value "142". All of the pixel values (which are ranged between 0~255) on the target image are calculated to accordingly generate a conversion table about the foresaid pixel values, and the pixel cumulative distribution of the reference image and the target images can be adjusted in unanimity in accordance with the conversion table, so as to reduce difference of the luminance information and/or the chroma information between the reference image and the target images.

It should be mentioned that the image calibrating method may apply the transform function to the adjacent regions on the plurality of images for adjustment, the luminance information and the chroma information of the adjacent regions are adjusted in unanimity, and the block comparison technique is utilized to find out the matching relation between the adjacent regions that had been adjusted by the transform function, so as to acquire preferred matching accuracy. For instance, the matching relation of the adjacent regions can be information of relative position between the adjacent stitched regions, or any information helpful to stitch the images. The foresaid adjacent regions may include all of the overlapped block or part of the overlapped block of the two adjacent images. A method of utilizing the whole overlapped block to find out the matching relation can reduce error but spend more operation efficiency, and a method of utilizing the partial overlapped block to find out the matching relation is preferred for consideration of the operation efficiency and comparison accuracy. While the matching relation between the adjacent images is confirmed, the image calibrating method applies the transform function to the whole target image to generate the adjusted target image, and the adjusted target image can be used in step 308 for the image stitching. Application of finding out the matching relation is not limited to the above-mentioned embodiment, which depends on design demand.

Figure 7:
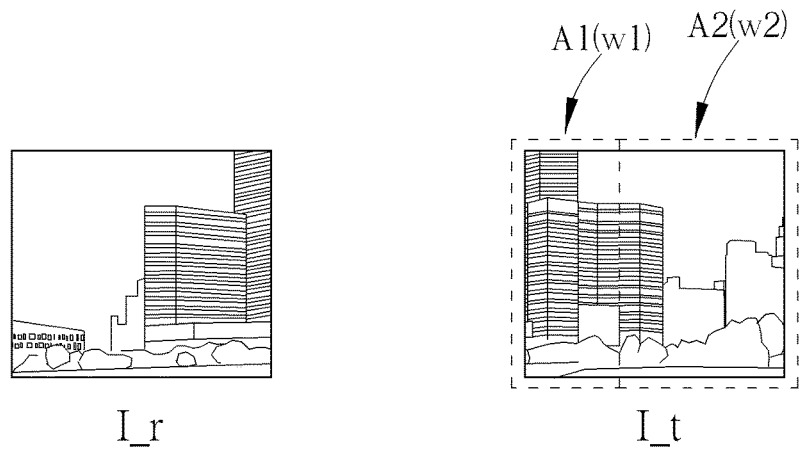
FIG. 7 and FIG. 8 respectively are diagrams of the target image capable of being adjusted by weight according to different embodiments of the present invention.
Figure 8:
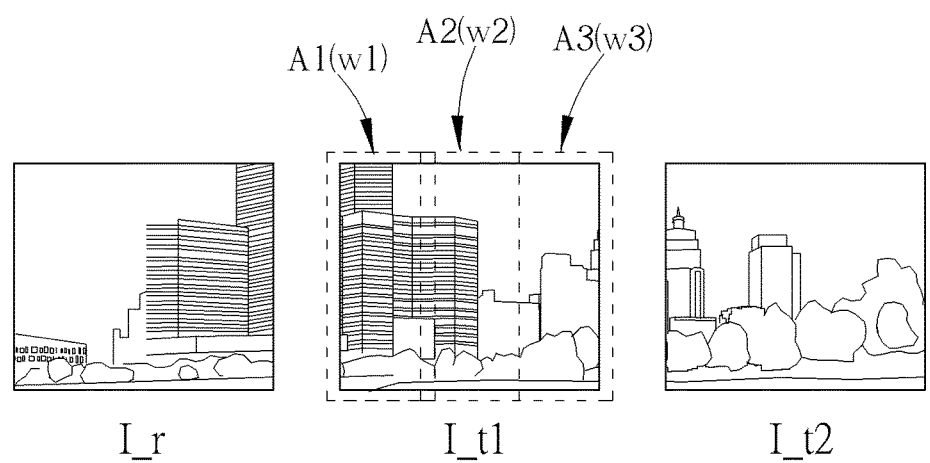

Please refer to FIG. 7 and FIG. 8. FIG. 7 and FIG. 8 respectively are diagrams of the target image capable of being adjusted by weights according to different embodiments of the present invention. The image calibrating method compares the luminance difference and/or the chroma difference between the adjacent regions on the image, and weight of the transform function can be adjusted by the foresaid difference between the luminance and chroma information, so as to make the stitching image have uniform color distribution. As shown in FIG. 7, the target image I_t can be divided into a first region A1 adjacent to the reference image I_r and a second region A2 far from the reference image I_r. For naturally stitching the first region A1 with the reference image I_r, the transforming weight w1 of the transform function applied to the first region A1 is preferably different from the transforming weight w2 of the transform function applied to the second region A2, so that the luminance information and the chroma information of the target image I_t can be gradually increased or decreased in accordance with different regions on the images.

For example, the calculation formula of the weight adjustment can be represented as: w×p(t)+(1−w)×p(i)=p. A symbol "w" is defined as the transforming weight, a symbol "p(t)" is defined as the pixel value adjusted by the transform function, a symbol "p(i)" is defined as an original pixel value not adjusted by the transform function, a symbol "p" is defined as the pixel value after weight adjustment. While difference of the luminance information and/or the chroma information between the reference image I_r and the target image I_t is small and the first region A1 has no need of heavy adjustment, the transforming weight w1 is low to naturally stitch the reference image I_r and the first region A1. While difference of the luminance information and/or the chroma information between the reference image I_r and the target image I_t is large, the transforming weight w1 is high to reduce the luminance and/or chroma difference between the reference image I_r and the first region A1. In some embodiment of the present invention, the transforming weight w1 is selected by a comparison of the luminance and/or chroma difference between the adjacent regions on the reference image I_r and the target image I_t.

As shown in FIG. 8, while the target image I_t1 is stitched between the reference image I_r and the target image I_t2, the target image I_t1 can be divided into the first region A1, the second region A1 and a third region A3. The first region A1 and the third region A3 are respectively adjacent to the reference image I_r and the target image I_t2, and the second region A2 is located between the first region A1 and the third region A3. The transforming weights w1, w3 of the transform function applied to the first region A1 and the third region A3 are different from the transforming weight w2 of the transform function applied to the second region A2. In this embodiment, the transforming weight w1 can be designed according to the luminance/chroma difference between the reference image I_r and the non-adjusted first region A1, the transforming weight w3 can be designed according to the luminance/chroma difference between the non-adjusted third region A3 and the target image I_t2. In this embodiment, the target image I_t1 can be divided into more than three regions, and each region has the specific transforming weight for pixel adjustment, to ensure that the target image I_t1 has no chromatic aberration and to maintain color continuity between the target image I_t1, the reference image I_r and the target image I_t2.

In conclusion, because the image captured by different image sensors may have luminance difference and/or chroma difference from each other, the image calibrating method of the present invention sets the image with maximal contrast value as the reference image, acquires the transform function by the probability distribution information of the reference image and the target images, and then adjusts the target images by the transform function. The adjusted target image has the luminance information and the chroma information identical to ones of the reference image, so that the stitching image combined by the reference image and the adjusted target image has preferred quality without the chromatic aberration, and more particularly, the present invention provides preferable effect while stitching the plurality of images captured by the image sensors adjacently placed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image calibrating method for stitching adjacent images, the image calibrating method comprising:
    calculating contrast values of a plurality of images;
    comparing the contrast values to set the image with maximal contrast value as a reference image, wherein the other images of the plurality of images are defined as target images;
    calculating probability distribution information of the reference image and the target images respectively; and
    obtaining a transform function according to the probability distribution information of the reference image and the target images for pixel adjustment of the target images, wherein the target image is divided into a first region adjacent to the reference image and a second region far from the reference image, transforming weight of the transform function applied to the first region is different from transforming weight of the transform function applied to the second region.

2. The image calibrating method of claim 1, wherein calculating the contrast values of the plurality of images comprises:

calculating the contrast value of each image according to luminance information or chroma information of the plurality of images.

3. The image calibrating method of claim 1, wherein the transform function adjusts pixel cumulative distribution of the target image to be similar to pixel cumulative distribution of the reference image in a linear interpolation method.

4. The image calibrating method of claim 1, further comprising:
utilizing block composition technique to combine the reference image with the adjusted target image according to matching relation between adjacent regions on the plurality of images.

5. The image calibrating method of claim 4, further comprising:
applying the transform function to the adjacent regions on the plurality of images; and
utilizing block comparison technique to find out the matching relation between the adjacent regions on the plurality of images that is adjusted by the transform function.

6. The image calibrating method of claim 4, further comprising:
applying the transform function to all regions on the target image so as to generate the adjusted target image.

7. The image calibrating method of claim 1, wherein the target is further divided into the first region, the second region and a third region, the first region and the third region are respectively adjacent to the reference image and another target image, the second region is located between the first region and the third region, transforming weights of the transform function applied to the first region and the third region are different from transforming weight of the transform function applied to the second region.

8. A camera with an image calibrating function, the camera comprising:
a plurality of image sensors adapted to respectively capture a plurality of images; and
a processor coupled to the plurality of image sensors and adapted to stitch the plurality of images, the processor being utilized to execute an image calibrating method of calculating contrast values of a plurality of images, comparing the contrast values to set the image with maximal contrast value as a reference image wherein the other images of the plurality of images are defined as target images, calculating probability distribution information of the reference image and the target images respectively, and obtaining a transform function according to the probability distribution information of the reference image and the target images for pixel adjustment of the target images, wherein the target image is divided into a first region adjacent to the reference image and a second region far from the reference image, transforming weight of the transform function applied to the first region is different from transforming weight of the transform function applied to the second region.

9. An image processing system, the image processing system comprising a processor and at least one camera coupled to each other, the processor being utilized to execute an image calibrating method of calculating contrast values of a plurality of images captured by the at least one camera, comparing the contrast values to set the image with maximal contrast value as a reference image wherein the other images of the plurality of images are defined as target images, calculating probability distribution information of the reference image and the target images respectively, and obtaining a transform function according to the probability distribution information of the reference image and the target images for pixel adjustment of the target images, wherein the target image is divided into a first region adjacent to the reference image and a second region far from the reference image, transforming weight of the transform function applied to the first region is different from transforming weight of the transform function applied to the second region.

10. The camera of claim 8, wherein the processor is utilized to further execute the image calibrating method of calculating the contrast value of each image according to luminance information or chroma information of the plurality of images.

11. The camera of claim 8, wherein the transform function adjusts pixel cumulative distribution of the target image to be similar to pixel cumulative distribution of the reference image in a linear interpolation method.

12. The camera of claim 8, wherein the processor is utilized to further execute the image calibrating method of utilizing block composition technique to combine the reference image with the adjusted target image according to matching relation between adjacent regions on the plurality of images.

13. The camera of claim 12, wherein the processor is utilized to further execute the image calibrating method of applying the transform function to the adjacent regions on the plurality of images, and utilizing block comparison technique to find out the matching relation between the adjacent regions on the plurality of images that is adjusted by the transform function.

14. The camera of claim 8, wherein the target is further divided into the first region, the second region and a third region, the first region and the third region are respectively adjacent to the reference image and another target image, the second region is located between the first region and the third region, transforming weights of the transform function applied to the first region and the third region are different from transforming weight of the transform function applied to the second region.

15. The image processing system of claim 9, wherein the at least one camera further comprises a plurality of image sensors, and the plurality of images are captured by the plurality of image sensors.

16. The image processing system of claim 9, wherein the processor is utilized to further execute the image calibrating method of calculating the contrast value of each image according to luminance information or chroma information of the plurality of images.

17. The image processing system of claim 9, wherein the transform function adjusts pixel cumulative distribution of the target image to be similar to pixel cumulative distribution of the reference image in a linear interpolation method.

18. The image processing system of claim 9, wherein the processor is utilized to further execute the image calibrating method of utilizing block composition technique to combine the reference image with the adjusted target image according to matching relation between adjacent regions on the plurality of images.

19. The image processing system of claim 18, wherein the processor is utilized to further execute the image calibrating method of applying the transform function to the adjacent regions on the plurality of images, and utilizing block comparison technique to find out the matching relation between the adjacent regions on the plurality of images that is adjusted by the transform function.

20. The image processing system of claim 9, wherein the target is further divided into the first region, the second region and a third region, the first region and the third region are respectively adjacent to the reference image and another target image, the second region is located between the first region and the third region, transforming weights of the transform function applied to the first region and the third region are different from transforming weight of the transform function applied to the second region.

* * * * *